United States Patent
Fukushige et al.

(10) Patent No.: US 12,179,796 B2
(45) Date of Patent: Dec. 31, 2024

(54) AUTONOMOUS CONTROL SYSTEM THAT PERFORMS PULL-OVER OPERATIONS THROUGH SEQUENTIAL STEERING AND DECELERATION INPUTS

(71) Applicant: Nissan Motor Co., Ltd., Yokohama (JP)

(72) Inventors: Takashi Fukushige, Kanagawa (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 197 days.

(21) Appl. No.: 17/310,336

(22) PCT Filed: Jan. 31, 2019

(86) PCT No.: PCT/IB2019/000120
§ 371 (c)(1),
(2) Date: Jul. 28, 2021

(87) PCT Pub. No.: WO2020/157533
PCT Pub. Date: Aug. 6, 2020

(65) Prior Publication Data
US 2022/0063669 A1    Mar. 3, 2022

(51) Int. Cl.
*B60W 40/08* (2012.01)
*B60W 30/14* (2006.01)
(Continued)

(52) U.S. Cl.
CPC ...... *B60W 60/0013* (2020.02); *B60W 30/146* (2013.01); *B60W 40/105* (2013.01);
(Continued)

(58) Field of Classification Search
CPC ....... B60W 60/0013; B60W 60/00253; B60W 2554/60; B60W 2554/803;
(Continued)

(56) References Cited

U.S. PATENT DOCUMENTS

2017/0151982 A1\* 6/2017 Fujii .................. G06V 20/588
2017/0341575 A1 11/2017 Hauler
(Continued)

FOREIGN PATENT DOCUMENTS

DE 11 2016 000695 T5 10/2017
JP 2009163434 A \* 7/2009
(Continued)

OTHER PUBLICATIONS

JP2009-163434A—Machine Translation, Fujishiro (Year: 2009).\*
JP2016-84093A—Machine Translation, Yasushi et al. (Year: 2016).\*

*Primary Examiner* — Jess Whittington
*Assistant Examiner* — Rami Nabih Bedewi
(74) *Attorney, Agent, or Firm* — Young Basile Hanlon & MacFarlane, P.C.

(57) ABSTRACT

When a subject vehicle arrives at a destination while traveling, or when a driver of the subject vehicle becomes unable to drive during travel or when a failure occurs that interferes with the travel of the subject vehicle during the travel, a control plan for autonomous stop control is generated, the control plan comprising deceleration control for decreasing a speed of the subject vehicle; pulling over control for moving the subject vehicle from a lane in which the subject vehicle travels to the shoulder of the road; and stop control for stopping the subject vehicle at the shoulder of the road, and on a basis of this control plan, the autonomous stop control is performed to decelerate the subject vehicle and then move it to the shoulder of the road by individually and sequentially performing each of the deceleration control, the pulling over control, and the stop control.

18 Claims, 9 Drawing Sheets

(51) Int. Cl.
  *B60W 40/105* (2012.01)
  *B60W 60/00* (2020.01)
(52) U.S. Cl.
  CPC .. *B60W 60/0018* (2020.02); *B60W 60/00253* (2020.02); *B60W 2554/60* (2020.02); *B60W 2554/801* (2020.02); *B60W 2554/803* (2020.02)
(58) Field of Classification Search
  CPC ....... B60W 60/0018; B60W 2554/801; B60W 30/146; B60W 40/105
  See application file for complete search history.

(56) References Cited

U.S. PATENT DOCUMENTS

| | | | | |
|---|---|---|---|---|
| 2018/0029604 | A1* | 2/2018 | Niino | G08G 1/166 |
| 2018/0251129 | A1* | 9/2018 | Ji | B60W 30/18163 |
| 2018/0326998 | A1* | 11/2018 | Aoi | B60W 50/10 |
| 2020/0139990 | A1* | 5/2020 | Hiruma | B60W 50/0205 |
| 2020/0216074 | A1* | 7/2020 | Ishioka | B60Q 5/005 |

FOREIGN PATENT DOCUMENTS

| | | | |
|---|---|---|---|
| JP | 2016-084093 | A | 5/2016 |
| JP | 201684093 | A * | 5/2016 |
| JP | 2017-210234 | A | 11/2017 |
| WO | 2015/179760 | A1 | 11/2015 |

\* cited by examiner

AUTONOMOUS CONTROL SYSTEM THAT PERFORMS PULL-OVER OPERATIONS THROUGH SEQUENTIAL STEERING AND DECELERATION INPUTS

TECHNICAL FIELD

The present invention relates to a travel control method and a travel control device for a vehicle comprising autonomous stop control of a subject vehicle.

BACKGROUND

A technique is known in which when a vehicle traveling in an autonomous travel mode is no longer able to continue the traveling in the autonomous travel mode, handover of a driving operation is required to a driver, and when the handover of the driving operation is not performed by the driver within a predetermined period, the vehicle is autonomously stopped at a shoulder of a road (JP2017-210234A). In this technique, when the vehicle is stopped at the shoulder of the road, a stop position of the vehicle is estimated, and steering control of the vehicle is performed while decreasing a vehicle speed to the estimated stop position.

SUMMARY

When travelling the vehicle closer to the shoulder of the road, an occupant of the vehicle may experience discomfort to a vehicle motion by the autonomous travel control compared to the driving operation by the driver. Therefore, in the autonomous travel control of the vehicle, it is required to execute control so as not to discomfort the occupant. However, although JP2017-210234A discloses the stop position of the vehicle and the route of the vehicle until the stop position, it does not disclose how to stop the vehicle so as not to discomfort the occupant. For this reason, the technique disclosed in the Patent Document 1 may strongly discomfort the occupant when the vehicle is controlled to approach the shoulder of the road.

The problem to be solved by the present invention is to provide a travel control method and a travel control device for a vehicle that can stop the vehicle at a shoulder of a road so as not to discomfort an occupant of the vehicle.

The present invention solves the above problem by generating a control plan for autonomous stop control and by performing each of deceleration control, pull over control and stop control individually and sequentially on the basis of the generated control plan, wherein the control plan comprises the deceleration control for decreasing a speed of a subject vehicle without moving the subject vehicle to the shoulder of the road, the pull over control for moving the subject vehicle from a lane on which the subject vehicle travels to a shoulder of a road and the stop control for stopping the subject vehicle at the shoulder of the road.

According to the present invention, since the subject vehicle is sufficiently decelerated and then moved to the shoulder of the road, the subject vehicle can stop at the shoulder of the road without discomforting the occupant.

DETAILED DESCRIPTION

Figure 1:
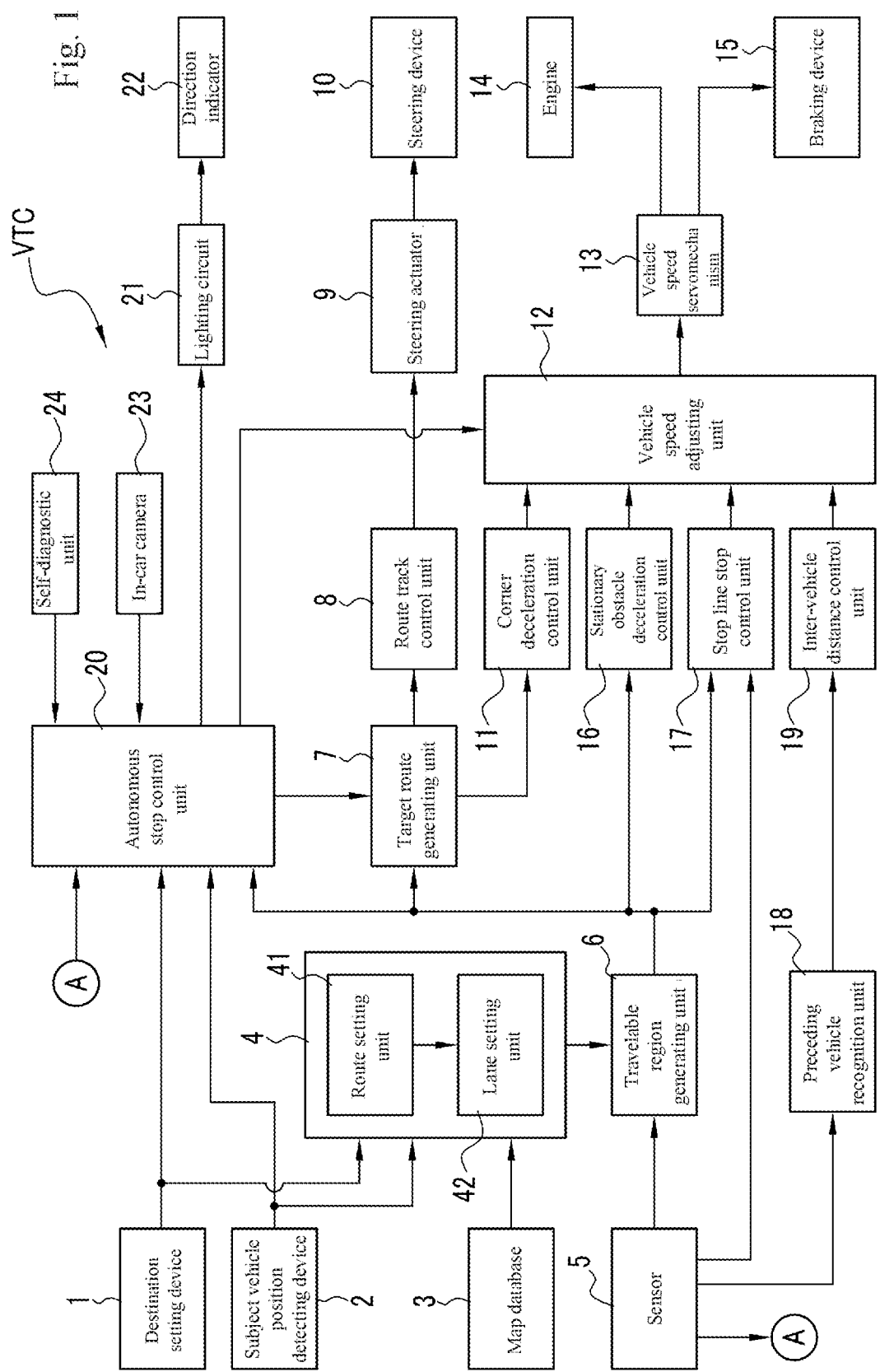
FIG. 1 is a block diagram illustrating an embodiment of the travel control device for a vehicle of the present invention.

FIG. 1 is a block diagram illustrating a configuration of the travel control device VTC of the present embodiment. The travel control device VTC of the present embodiment are also an embodiment for implementing the travel control method for a vehicle of the present invention. The travel control device VTC is, for example, an in-car device mounted on a vehicle, and has various functions for controlling travel of the subject vehicle $V_0$ (see FIG. 2) on which the travel control device VTC is mounted. For example, the travel control device VTC has an autonomous travel control function that autonomously travels the subject vehicle $V_0$ to a set destination, and in addition, an autonomous stop control function that stops the subject vehicle $V_0$ at the shoulder of the road from a lane on which the subject vehicle $V_0$ travels when $V_0$ arrives at the destination.

The travel control device VTC according to the present embodiment comprises a destination setting device 1, a subject vehicle position detecting device 2, a map database 3, a route setting unit 4, a sensor 5, a travelable region generating unit 6, a target route generating unit 7, a route track control unit 8, a steering actuator 9, a steering device 10, a corner deceleration control unit 11, a vehicle speed adjusting unit 12, a vehicle speed servomechanism 13, an engine 14, a braking device 15, a stationary obstacle deceleration control unit 16, a stop line stop control unit 17, a preceding vehicle recognition unit 18, an inter-vehicle distance control unit 19, an autonomous stop control unit 20, a lighting circuit 21, a direction indicator 22, an in-car camera 23, and a self-diagnostic unit 24.

Among the various devices constituting the travel control device VTC, the route setting unit 4, the travelable region generating unit 6, the target route generating unit 7, the route track control unit 8, the corner deceleration control unit 11, the vehicle speed adjusting unit 12, the stationary obstacle deceleration control unit 16, the stop line stop control unit 17, the inter-vehicle distance control unit 18, the autonomous stop control unit 19, the self-diagnostic unit 20 and the stop line stop control unit 24 are composed of one or more computers and software installed in the computer. The computer comprises a ROM that stores a program for having each unit described above to function, a CPU that executes the program stored in the ROM, and a RAM that functions as an accessible storage device. In addition, an MPU, a DSP, an ASIC, an FPGA, and the like can be used instead of or together with the CPU.

In order to transmit and receive information to each other, the computers constituting the devices described above is connected to the destination setting device 1, the subject vehicle position detecting device 2, the map database 3, the sensor 5, the steering actuator 9, the vehicle speed servomechanism 13, the lighting circuit 21, and the in-car camera 23 by, for example, a CAN (Controller Area Network) and other vehicle-mounted LANs.

The destination setting device 1 sets a destination at which the subject vehicle $V_0$ travels with the autonomous travel control function. The destination setting device 1 comprises a display device and an input device. The display device is, for example, a display such as a liquid crystal panel, and displays map information read from the map database 3, setting information for setting the destination, and the like. The input device is, for example, a touch screen disposed on a display screen, a dial switch, a microphone capable of inputting by voice of a driver, and the like. The input device is used, for example, for an input operation of the destination with respect to the setting information displayed on the display device. The destination setting device 1 generates destination information representing a position of the destination based on the map information, the setting information, and the input information input from the input device.

The subject vehicle position detecting device 2 detects a current position of the subject vehicle $V_0$. The subject vehicle position detecting device 2 comprises a GPS unit, a gyro sensor, a vehicle speed sensor, and the like. The subject vehicle position detecting device 2 detects radio waves transmitted from a plurality of satellite communications by the GPS unit, periodically acquires position information of the subject vehicle $V_0$, detects the current position of the subject vehicle $V_0$ based on the acquired position information of the subject vehicle $V_0$, angular change information acquired from the gyro-sensor, and speed information acquired from the vehicle speed sensor, and generates subject vehicle position information representing the current position.

The map database 3 stores low-definition map information and high-definition three-dimensional map information. The low-definition map information is map information used in a general car navigation equipment, etc., and information on roads is recorded together with location information of various facilities and specific sites. The information on roads includes location information such as merge points, branch points, tollgates, locations at which lanes decrease, service areas (SA)/parking areas (PA), and information relating to the roads such as road types, road widths, the number of lanes, road radii, presence or absence of exclusive use lanes for right-turn or left-turn and the number of the exclusive use lanes, and speed limits. The high-definition three-dimensional map information is three-dimensional map information based on road shapes detected when a data acquisition vehicle travels an actual road. The high-definition three-dimensional map information is the map information to which, together with the map information, detailed and high-definition location information such as the merge points of the roads, the branching points, the tollgates, the positions at which the number of lanes decrease, the service areas/parking areas, etc. are related as three-dimensional information.

The route setting unit 4 generates a travel route to the destination of the subject vehicle $V_0$. The route setting unit 4 comprises a route generating unit 41 and a lane setting unit 42. The route generating unit 41 generates the travel route from the current position of the subject vehicle $V_0$ to the destination based on the destination information acquired from the destination setting device 1, the subject vehicle position information acquired from the subject vehicle position detecting device 2, and the map information acquired from the map database 3. The lane setting unit 42 sets a lane in which the subject vehicle $V_0$ travels on the travel route based on the high-definition three-dimensional map information acquired from the map database 3.

The sensor 5 detects a situation around the subject vehicle $V_0$. The sensor 5 comprises, for example, a camera, a radar device, and a LiDAR (Light Detection And Ranging) device. The camera is an image sensor for obtaining image data by capturing a predetermined area in front of the subject vehicle $V_0$, and comprises, for example, a CCD-wide-angle camera provided at an upper portion of a front windshield in a vehicle cabin. The camera may be a stereo camera or an omnidirectional camera and may include a plurality of the image sensors. The travel control device VTC detects, from the image data captured by the camera, roads and structures around the roads, road signages, signs, stop lines, other vehicles, two-wheeled vehicles, bicycles, pedestrians, and the like that exist in front of the subject vehicle $V_0$ as the situation around the subject vehicle $V_0$.

The radar device scans a predetermined area around the subject vehicle $V_0$ by irradiating millimeter waves or ultrasonic waves in front of the subject vehicle $V_0$ and detects obstructions such as other vehicles, two-wheeled vehicles, bicycles, pedestrians, curbs of shoulders of roads, guardrails, wall-surfaces, fills, and the like that exist around the subject vehicle $V_0$. For example, the radar device detects a relative position (azimuth direction) between the obstacle and the subject vehicle $V_0$, the relative speed of the obstacle, the distance from the subject vehicle $V_0$ to the obstacle, and the like as the situation around the subject vehicle $V_0$.

Figure 2:
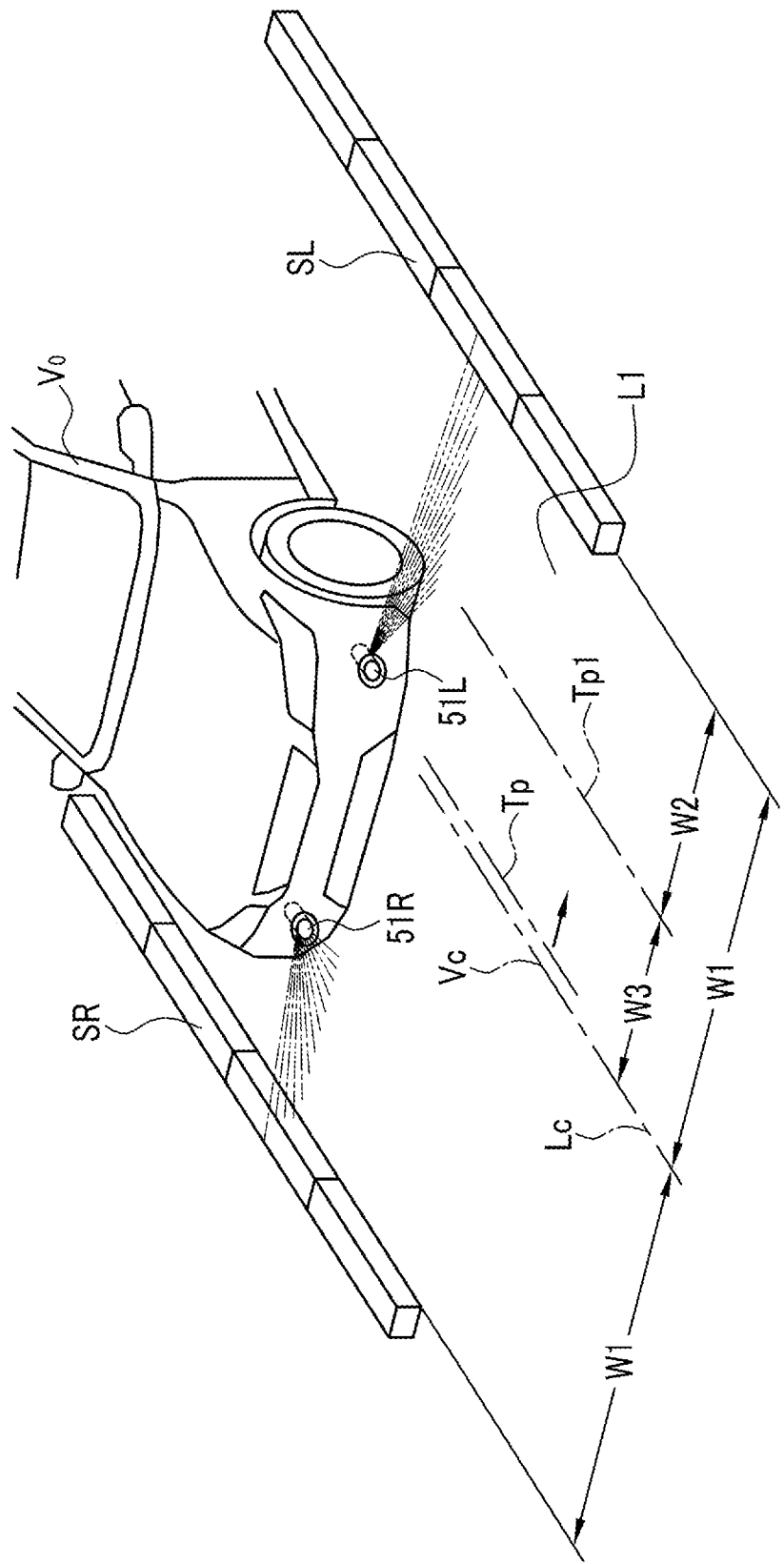
FIG. 2 is a diagram illustrating that a target route is set by detecting a distance from the subject vehicle to a curb.

The LiDAR device irradiates laser beam around the subject vehicle $V_0$ to scan a predetermined area around the subject vehicle $V_0$ and detects obstacles such as other vehicles, two-wheeled vehicles, bicycles, pedestrians, curbs of shoulders of roads, guardrails, wall-surfaces, fills, and the like that exist around the subject vehicle $V_0$. For example, the LiDAR device detects the relative position (azimuth direction) between the obstacle and the subject vehicle $V_0$, the relative speed of the obstacle, the distance from the subject vehicle $V_0$ to the obstacle, shapes of the obstacle, and the like as the situation around the subject vehicle $V_0$ by receiving the laser beam reflected by the surrounding obstacles and mapping it three-dimensionally. In the present embodiment, as illustrated in FIG. 2, the LiDAR devices 51L, 51R are mounted on the left-side and the right-side of the front bumper of the subject vehicle $V_0$, and the LiDAR devices 51L, 51R scans the laser beam L around an axis along the front direction and rear direction of the subject vehicle $V_0$ as a rotational axis, thereby detecting the obstacles such as curbs SL, SR, etc. existing in the left-side direction and right-side direction of the subject vehicle $V_0$.

The travelable region generating unit 6 generates a region on the travel route in which the subject vehicle $V_0$ can travel. The travelable region generating unit 6 acquires the travel route from the route setting unit 4 and acquires information on the situation around the subject vehicle $V_0$ from the sensor 5. Based on the acquired travel route and the information on the situation around the subject vehicle $V_0$, the travelable region generating unit 6 specifies a region occupied by the obstacles, such as other vehicles, pedestrians, parking vehicles, travel-restricted areas due to constructions, and the like, in the lane set as the travel route, sets a non-occupied region not occupied by the obstacles as a travelable region of the subject vehicle $V_0$, and generates travelable region information on the set region.

The target route generating unit 7 generates a target route as a target to be tracked to when the subject vehicle $V_0$ is traveling in the travelable region. The target route generating unit 7 acquires the travelable region information from the travelable region generating unit 6 and acquires the information on the situation around the subject vehicle $V_0$ from the sensor 5. The target route generating unit 7 extracts a left-side boundary line and a right-side boundary line from the travelable region based on the acquired travelable region information and the information on the situation around the subject vehicle $V_0$, and generates the target route at the center of the travelable region at which distances from the left-side boundary line and the right-side boundary line are equal. For example, in the example illustrated in FIG. 2, the curb SL on the left-side and the curb SR on the right-side are respectively set to the left-side boundary line and the right-side boundary line, and the target route Tp is set on the lane center line Lc at which the distances from the curb SL on the left-side and the curb SR on the right-side are equal.

The route track control unit 8 has the subject vehicle $V_0$ to travel to track to the target route Tp. Specifically, as illustrated in FIG. 2, the route track control unit 8 controls the steering device 10 via the steering actuator 9 so that a vehicle centerline Vc set along the front direction and rear direction of the subject vehicle $V_0$ moves on the target route Tp generated by the target route generating unit 7. The subject vehicle $V_0$ then travels along the travel route to follow the target route Tp.

The corner deceleration control unit 11 decreases a speed of the subject vehicle $V_0$ so as not to discomfort occupants when positions to turn right or left, curves, and the like exist on the target route Tp generated by the target route generating unit 7. Specifically, the corner deceleration control unit 11 acquires the target route Tp from the target route generating unit 7, sets a speed after the deceleration based on a right-turn angle and a left-turn angle, a radius of the curve, and the like of the target route Tp, and inputs deceleration information on the speed after the deceleration to the vehicle speed adjusting unit 12. The vehicle speed adjusting unit 12 controls the engine 14 and the braking device 15 via the vehicle speed servomechanism 13 based on the deceleration information input from the corner deceleration control unit 11 and decreases the speed of the subject vehicle $V_0$.

The stationary obstacle deceleration control unit 16 decreases the speed of the subject vehicle $V_0$ so that stationary obstacles can be avoided without discomforting the occupants when the travel-restricted regions due to the parking vehicles, constructions, and the like exist in the lane set as the travel route. Specifically, the stationary obstacle deceleration control unit 16 acquires the travelable region information from the travelable region generating unit 6 and acquires the information on the situation around the subject vehicle $V_0$ from the sensor 5. The stationary obstacle deceleration control unit 16 sets the speed after the deceleration based on the acquired travelable region information and the information on the situation around the subject vehicle $V_0$, and inputs the deceleration information on the speed after the deceleration to the vehicle speed adjusting unit 12. The vehicle speed adjusting unit 12 controls the engine 14 and the braking device 15 via the vehicle speed servomechanism 13 based on the deceleration information input from the stationary obstacle deceleration control unit 16 and decreases the speed of the subject vehicle $V_0$.

The stop line stop control unit 17 stops the subject vehicle $V_0$ according to the stop line when the subject vehicle $V_0$ arrives at a temporary stop point such as an intersection. Specifically, the stop line stop control unit 17 specifies that the subject vehicle $V_0$ has arrived at the intersection and the like based on the subject vehicle position information acquired from the subject vehicle position detecting device 2 and the travel route set by the route setting unit 4, and detects a position of the stop line by the camera of the sensor 5. Then, the vehicle speed adjusting unit 12 controls the engine 14 and the braking device 15 via the vehicle speed servomechanism 13, thereby the stop line stop control unit 17 stops the subject vehicle $V_0$ according to the stop line.

The preceding vehicle recognition unit 18 and the inter-vehicle distance control unit 19 decrease the speed of the subject vehicle $V_0$ when a preceding vehicle traveling on the same lane as the subject vehicle $V_0$ travels exists so that a predetermined inter-vehicle distance between the preceding vehicle and the subject vehicle $V_0$ is secured. Specifically, the preceding vehicle recognition unit 18 recognizes the preceding vehicle based on the surrounding situation detected by the radar device of the sensor 5, calculates the distance between the preceding vehicle and subject vehicle $V_0$ and the relative speed with respect to the preceding vehicle, and inputs calculation results to the inter-vehicle distance control unit 19 as inter-vehicle distance information and relative speed information. The inter-vehicle distance control unit 19 controls the control engine 14 and the braking device 15 by the vehicle speed adjusting unit 12 via the vehicle speed servomechanism 13 based on the inter-vehicle distance information, the relative speed information and the distance information input from the preceding vehicle recognition unit 18 so that the distance between the preceding vehicle and the subject vehicle $V_0$ becomes the predetermined inter-vehicle distance.

The autonomous stop control unit 20 performs an autonomous stop control that stops the subject vehicle $V_0$ at the shoulder of the road when the subject vehicle arrives at the destination while the subject vehicle travels, or when the driver of the subject vehicle becomes unable to drive during travel of the subject vehicle or when the failure occurs that interferes with the travel of the subject vehicle during the travel of the subject vehicle.

Figure 3:
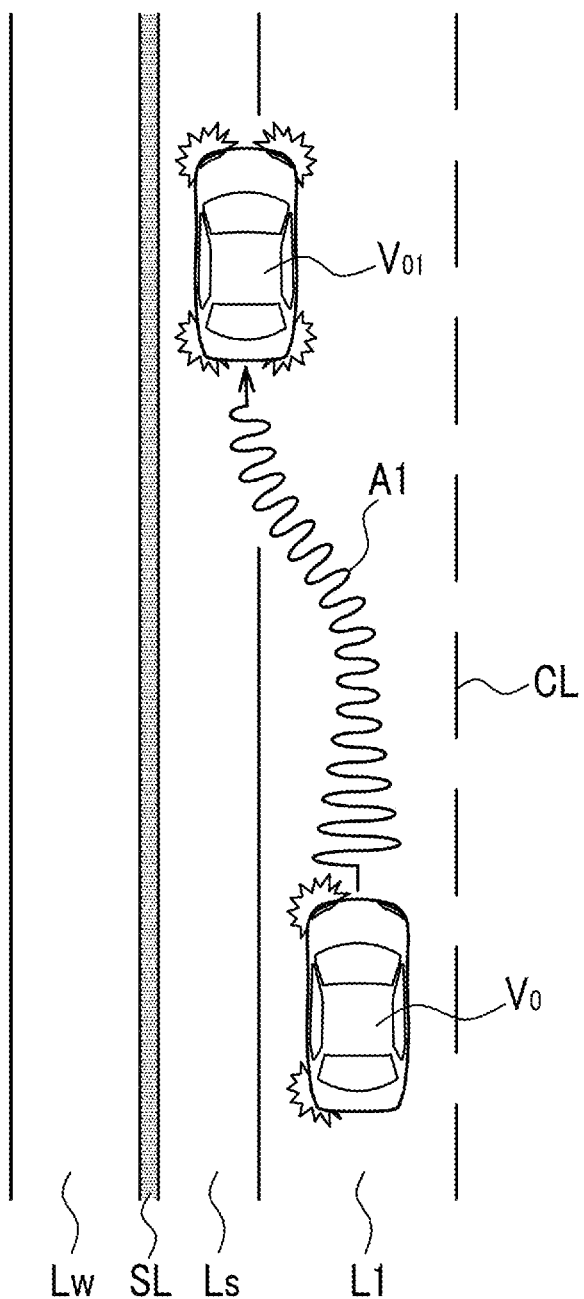
FIG. 3 is a plan view illustrating a travel scene of an autonomous stop control according to an embodiment of the present invention.

FIG. 3 illustrates a travel scene in which the subject vehicle $V_0$ traveling on a two-lane road that is the left-hand traffic travels from the lane L1 to the shoulder of the road Ls at the left-side edge to stop with the autonomous stop control according to the present embodiment. Incidentally, the reference numerals SL, Lw, CL shown in the figure respectively indicate the curb provided at the left-side edge of the shoulder of the road Ls, the sidewalk provided on the left-side of the shoulder of the road Ls, and the center line of the two-lane road. The subject vehicle $V_{01}$ also indicates the subject vehicle $V_0$ after completion of the autonomous stop control. The arrow A1 depicted in front of the subject vehicle $V_0$ indicates a travel route of the subject vehicle $V_0$ in the autonomous stop control, and an amplitude of the arrow A1 indicates the speed of the subject vehicle $V_0$ by its width. In other words, the larger the amplitude of the arrow A1 is, the higher the speed of the subject vehicle $V_0$ is, and the smaller the amplitude is, the lower the speed is.

Figure 4:
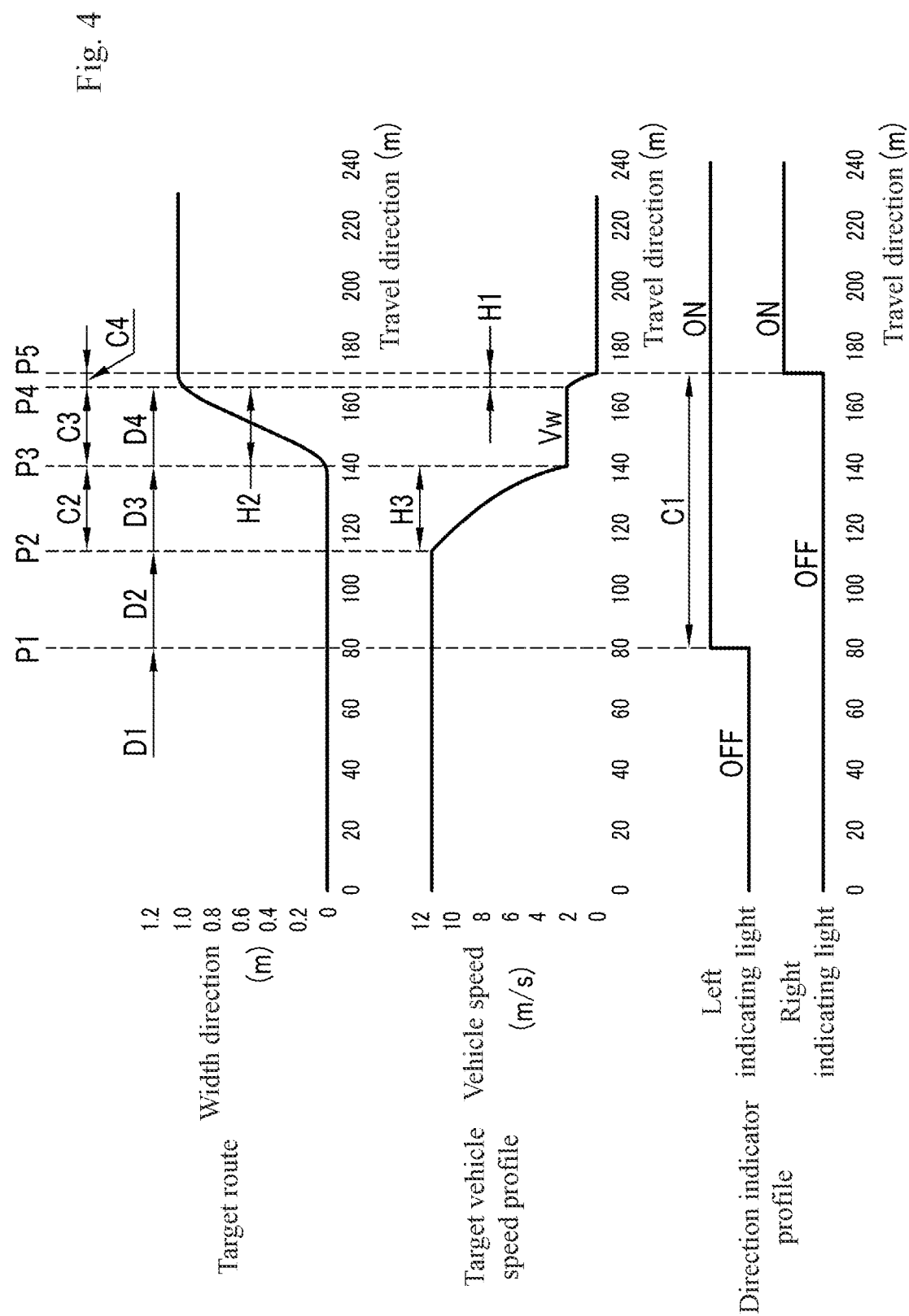
FIG. 4 is a diagram illustrating the target route, a target vehicle speed profile, and a direction indicator profile in the travel scene illustrated in FIG. 3.

FIG. 4 also illustrates the target route, the target vehicle speed profile, and the direction indicator profile of the autonomous stop control in the travel scene described above.

The target route is the target route Tp generated by the target route generating unit 7. The target vehicle speed profile shows a change of the speed of the subject vehicle $V_0$ adjusted by the vehicle speed adjusting unit 12. The direction indicator profile shows a timing that the lighting circuit 21 operates the direction indicator 22 and a content of the operation.

Figure 5:
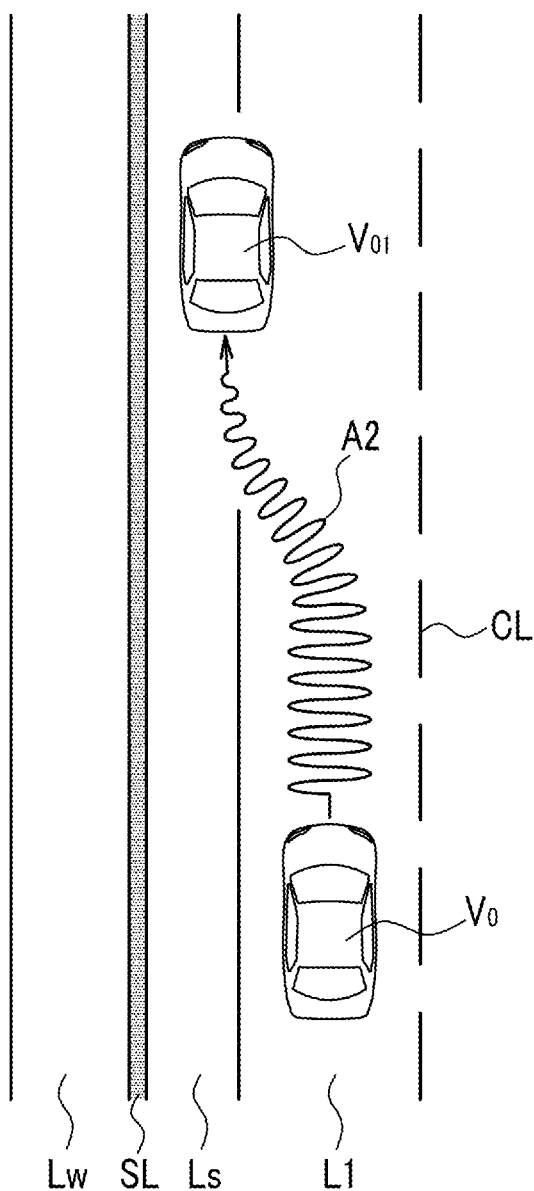
FIG. 5 is a plan view illustrating a travel scene of a conventional autonomous stop control that simultaneously performs decelerating of the subject vehicle and moving the subject vehicle to the shoulder of the road.

And now, since a movement of the subject vehicle $V_0$ travelling from the lane L1 to the shoulder of the road Ls is a movement approaching the road edge, the occupants may feel the discomfort depending on the travel speed and the like. In particular, when an obstacle such as the curb SL exists at the shoulder of the road Ls, the occupant may feel the strong discomfort. For example, the travel scene illustrated in FIG. 5 is a conventional travel scene in which the subject vehicle $V_0$ simultaneously performs the deceleration and the movement to the shoulder of the road Ls. In the autonomous stop control in such a travel scene, as indicated by the amplitudes of the arrow A2, the speed of the subject vehicle $V_0$ to travel to the shoulder of the road Ls may be higher than a speed expected by the occupant, therefore, the speed of the subject vehicle $V_0$ to travel to the shoulder of the road Ls may strongly discomfort the occupant.

However, in the autonomous stop control of the present embodiment, as seen from the travel scenes illustrated in FIG. 3 and the target route and the target vehicle speed profiles illustrated in FIG. 4, the subject vehicle $V_0$ travels from the lane L1 to the shoulder of the road Ls after the speed of the subject vehicle $V_0$ is decreased. In the autonomous stop control of the present embodiment, the speed of the subject vehicle $V_0$ is sufficiently decreased in advance, the subject vehicle $V_0$ travels from the lane L1 to the shoulder of the road Ls at the speed after the deceleration, and the speed is kept constant while travelling to the shoulder of the road Ls. As a result, according to the autonomous stop control of the present embodiment, since the speed of the subject vehicle $V_0$ travelling to the shoulder of the road Ls becomes low and rolling, pitching and the like due to the change of speed do not occur to the subject vehicle $V_0$, the subject vehicle $V_0$ can stop at the shoulder of the road Ls without providing the occupant with the discomfort.

Further, in the autonomous stop control of the present embodiment, in order to decelerate in the lane L1 safely, the direction indicator 22 is operated predetermined time before the subject vehicle $V_0$ starts the deceleration, and it is notified to other vehicles travelling behind the subject vehicle $V_0$ that the subject vehicle $V_0$ stops at the shoulder of the road Ls. In FIG. 3, a lighting state of the direction indicator 22 is illustrated at the four corners of the subject vehicle $V_{01}$. Thus, since that the subject vehicle $V_0$ stops at the shoulder of the road Ls can be notified to the other vehicles travelling behind the subject vehicle $V_0$ earlier, the deceleration in the lane L1 can be performed safely.

To achieve the autonomous stop control described above, the present embodiment performs the autonomous stop control by configuring the autonomous stop control by combining several types of control and performing each type of the control individually and sequentially. As illustrated in FIG. 4, the autonomous stop control of the present embodiment comprises: the direction indication control C1 for performing a directional indication to the shoulder of the road Ls by the subject vehicle $V_0$; the deceleration control C2 for decreasing the speed of the subject vehicle $V_0$; the pulling over control C3 for moving the subject vehicle $V_0$ from the lane L1 on which the subject vehicle $V_0$ travels to the shoulder of the road Ls; and the stop control C4 for stopping the subject vehicle $V_0$ at the shoulder of the road Ls. The autonomous stop control unit 20 generates a control plan including contents of performing, timings of performing, and the like of these types of control, and performs each types of the control individually and sequentially in accordance with the generated control plan, thereby performing the autonomous stop control of the present embodiment.

The autonomous stop control of the present embodiment has a plurality of stop modes in order to perform the optimum stop control according to the object for stopping the subject vehicle $V_0$. Specifically, the autonomous stop control includes a right arrival mode that is performed when the subject vehicle $V_0$ having arrived at the destination is stopped to the shoulder of the road Ls, and an emergency stop mode that is performed when the driver of the subject vehicle $V_0$ becomes unable to drive or when the failure that interferes with the travel of the subject vehicle $V_0$ occurs. The right arrival mode and the emergency stop mode of the present embodiment correspond to a first mode and a second mode of the present invention.

The right arrival mode and the emergency stop mode of the autonomous stop control differ from each other in the motion of the subject vehicle $V_0$ during the autonomous stop control. The vehicle motion herein refers to physical quantities observed in the subject vehicle $V_0$ when the subject vehicle $V_0$ stops at the shoulder of the road Ls. For example, the vehicle motion refers to negative acceleration that occurs when the subject vehicle $V_0$ is decelerated (hereinafter referred to as "deceleration"), or a speed, a lateral speed, lateral acceleration and the like when the subject vehicle $V_0$ travels to the shoulder of the road Ls. The subject vehicle $V_0$ stops, in the right arrival mode at the destination set in advance, by a relatively slow vehicular motion at the shoulder of the road Ls so that the discomfort is not provided to the occupant of the subject vehicle $V_0$ because there is enough time for the control. On the other hand, in the emergency stop mode, since it is necessary to stop the subject vehicle $V_0$ quickly, the subject vehicle $V_0$ is stopped at the shoulder of the road Ls with the vehicle movement faster than the vehicle movement in the right arrival mode (i.e., larger change in the vehicle condition), and the subject vehicle $V_0$ is stopped so as to decrease the discomfort felt by the occupant even if there is a possibility that the discomfort is provided to the occupant.

Figure 6:
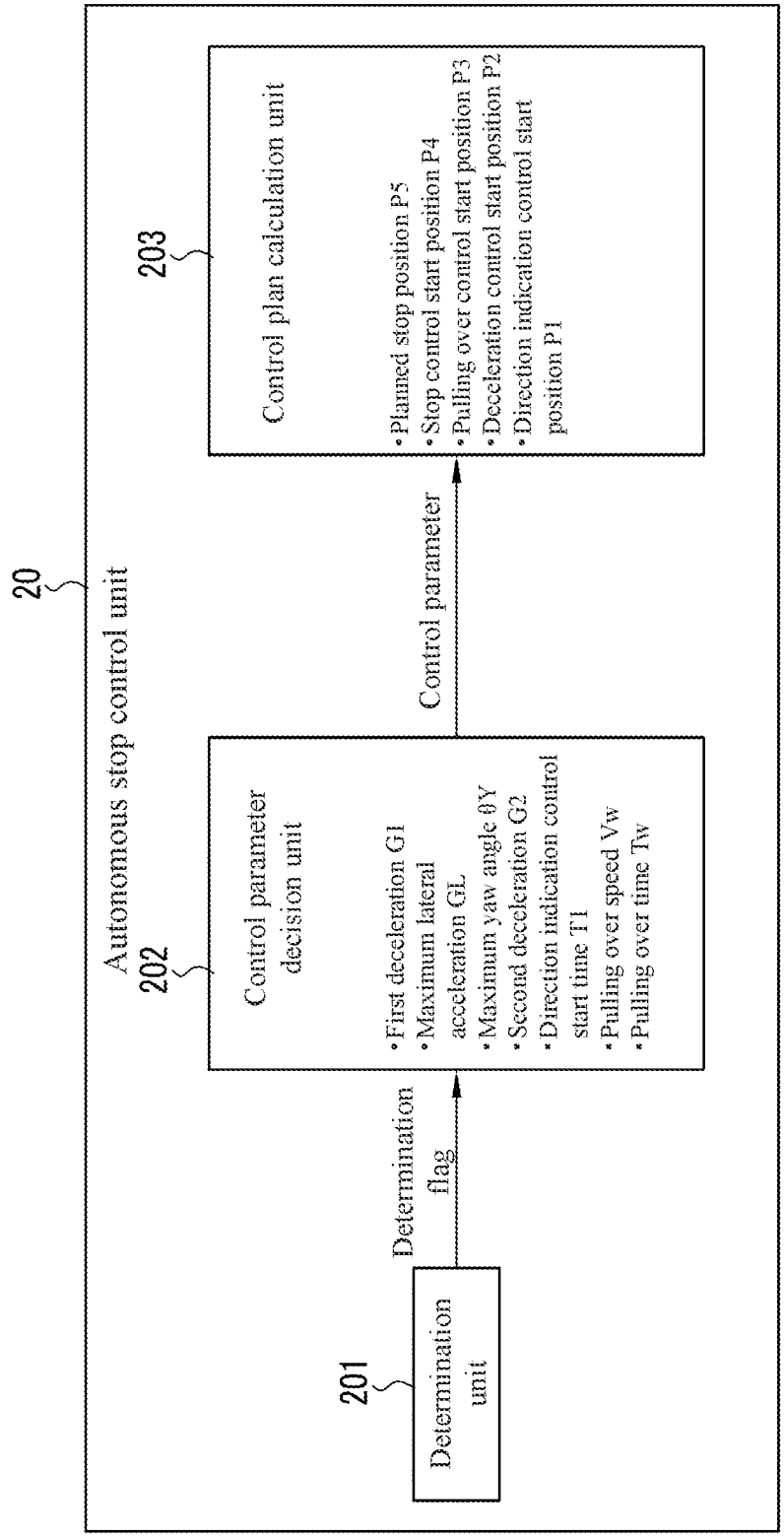
FIG. 6 is a block diagram illustrating a configuration of the autonomous stop control unit illustrated in FIG. 1.

In the following, generation of the control plan of the autonomous stop control by the autonomous stop control unit 20 is explained. The autonomous stop control unit 20 comprises a determination unit 201, a control parameter decision unit 202, and a control plan calculation unit 203, as illustrated in FIG. 6.

The determination unit 201 determines whether the subject vehicle $V_0$ performs the autonomous stop control. Specifically, based on the destination information acquired from the destination setting device 1, the subject vehicle position information acquired from the subject vehicle position detecting device 2, and the travelable region information acquired from the travelable region generating unit 6, the determination unit 201 determines whether the autonomous stop control needs to be performed when the subject vehicle $V_0$ approaches the destination within a predetermined distance.

Further, the determination unit 201 determines whether the driver can perform the driving based on the image data input from the in-car camera 23 illustrated in FIG. 1. The in-car camera 23 is an image sensor for obtaining image data by capturing an upper body of the driver. The in-car camera 23 is, for example, a CCD wide-angle camera provided in the upper portion of the front windshield in the vehicle cabin. The determination unit 201 analyzes the image data of the in-car camera 23 and determines that the autonomous stop control needs to be performed when the driver is found to be dozing from the analysis result.

Incidentally, the state in which the driver cannot drive the vehicle may include, in addition to the doze, a state in which the driver is unconscious due to illness, injury, and the like, a state in which the driver is performing an action other than the driving and cannot immediately start driving of the subject vehicle $V_0$, and the like. The actions performed by the driver other than the driving of the vehicle include, for example, an action of watching a video displayed on the display device of the subject vehicle $V_0$, an action of making a phone call with a mobile phone, an action of operating a mobile terminal such as a smartphone, and an action of reading, eating, and drinking. In the same manner as when detecting the doze, the image data of the in-car camera 23 can be used for detecting these actions.

In addition, the determination unit 201 determines whether the failure that interferes with the travel of the subject vehicle $V_0$ is occurred, based on a diagnostic result of the self-diagnostic unit 24 illustrated in FIG. 1. The self-diagnostic unit 24, also known as "OBD" (On Board Diagnostics), is mounted on a vehicle to diagnose abnormalities and failures in various parts of the vehicle and to display results of the diagnosis on an instrument panel and the like. The determination unit 201 determines that the autonomous stop control needs to be performed when the self-diagnostic unit 24 detects a failure or an abnormality that interferes with the travel of the subject vehicle $V_0$.

When the subject vehicle $V_0$ arrives at the destination, the determination unit 201 inputs a determination flag "1" into the control parameter decision unit 202 in order to perform the autonomous stop control of the right arrival mode. Further, when the driver becomes unable to drive the vehicle, or when the failure that interferes with the travel of the subject vehicle $V_0$ occurs, the determination unit 201 inputs a determination flag "0" to the control parameter decision unit 202 in order to perform the autonomous stop control of the emergency stop mode.

The control parameter decision unit 202 generates control parameters used to generate the control plan of the autonomous stop control of the present embodiment. When the determination flag "1" is input from the determination unit 201, the control parameter decision unit 202 decides the control parameter for the right arrival mode. When the determination flag "0" is input from the determination unit 201, the control parameter decision unit 202 decides the control parameter for the emergency stop mode. The control parameter decision unit 202 decides, as the control parameters, first deceleration G1, maximum lateral acceleration GL, a maximum yaw angle $\theta Y$, second deceleration G2, direction indication control start time T1, a pulling over speed Vw, and pulling over time Tw.

The second deceleration G2 is deceleration for decelerating the subject vehicle $V_0$ traveling in the lane L1 with the deceleration control C2. In the autonomous stop control of the present embodiment, the second deceleration G2 is predetermined and stored in the ROM and the like in order to decelerate the subject vehicle $V_0$ so as not to discomfort the occupant. In the autonomous stop control of the present embodiment, as the second deceleration G2, the second deceleration G2*a* for the right arrival mode and the second deceleration G2*b* for the emergency stop mode are preset. The second deceleration G2*a* and the second deceleration G2*b* have different set values, for example, the second deceleration G2*a* is less than the second deceleration G2*b*.

Thus, in the right arrival mode of the autonomous stop control, the subject vehicle $V_0$ decelerate more slowly than in the emergency stop mode. In other words, in the deceleration control C2 of the emergency stop mode, the change of the speed in the front direction and rear direction of the vehicle as a condition change of the subject vehicle $V_0$ becomes greater than the change of the speed in the deceleration control C2 of the right arrival mode.

The maximum lateral acceleration GL is the maximum lateral acceleration when the subject vehicle $V_0$ travels from the lane L1 to the shoulder of the road Ls in the pulling over control C3. In the autonomous stop control of the present embodiment, in order to move the subject vehicle $V_0$ to the shoulder of the road Ls so as not to discomfort the occupant, the maximum lateral acceleration GL when the subject vehicle $V_0$ travels to the shoulder of the road Ls is predetermined and stored in the ROM and the like. Further, in the autonomous stop control of the present embodiment, as the maximum lateral acceleration GL, the maximum lateral acceleration GLa for the right arrival mode and the maximum lateral acceleration GLb for the emergency stop mode are preset. The maximum lateral acceleration GLa and the maximum lateral acceleration GLb have the different set values, for example, the maximum lateral acceleration GLa is less than the maximum lateral acceleration GLb. Thus, in the right arrival mode of the autonomous stop control, the subject vehicle $V_0$ travels to the shoulder of the road Ls more slowly than in the emergency stop mode. In other words, in the pulling over control C3 of the emergency stop mode, the change of the lateral speed as a condition change of the subject vehicle $V_0$ is greater than the change of the lateral speed in the pulling over control C3 of the right arrival mode.

The maximum yaw angle $\theta Y$ is a maximum yaw angle with respect to a direction in which the lane L1 extends when the subject vehicle $V_0$ travels from the lane L1 to the shoulder of the road Ls in the pulling over control C3. In the autonomous stop control of the present embodiment, in order to move the subject vehicle $V_0$ to the shoulder of the road Ls so as not to discomfort the occupant, the maximum yaw angle $\theta Y$ when the subject vehicle $V_0$ travels to the shoulder of the road Ls is predetermined and stored in the ROM and the like. Further, in the autonomous stop control of the present embodiment, as the maximum yaw angle $\theta Y$, a maximum yaw angle $\theta Ya$ for the right arrival mode and a maximum yaw angle $\theta Yb$ for the emergency stop mode are preset. And the maximum yaw angle $\theta Ya$ and the maximum yaw angle $\theta Yb$ have the different set values, for example, the maximum yaw angle $\theta Ya$ is less than the maximum yaw angle $\theta Yb$. Thus, in the right arrival mode of the autonomous stop control, the subject vehicle $V_0$ travels to the shoulder of the road Ls with a gentler angle than in the emergency stop mode. In other words, in the pulling over control C3 of the emergency stop mode, the change of a lateral position in the lane L1 as a condition change of the subject vehicle $V_0$ becomes greater than the change of the lateral position in the pulling over control C3 of the right arrival mode.

The first deceleration G1 is deceleration when stopping the subject vehicle $V_0$ that travels by the shoulder of the road Ls in the stop control C4. In the autonomous stop control of the present embodiment, in order to decelerate subject vehicle $V_0$ so as not to discomfort the occupant of the subject vehicle $V_0$, the first deceleration G1 is predetermined and stored in the ROM and the like. In the autonomous stop control of the present embodiment, as the first deceleration G1, a first deceleration G1*a* for the right arrival mode and a first deceleration G1b for the emergency stop mode are preset. The first deceleration G1a and the first deceleration G1b have different set values, for example, the first deceleration G1a is less than the first deceleration G1b. Thus, in the right arrival mode of the autonomous stop control, the subject vehicle $V_0$ stops more slowly than in the emergency stop mode. In other words, in the deceleration control C4 of the emergency stop mode, the change of the speed in the front direction and rear direction of the vehicle as a condition change of the subject vehicle $V_0$ becomes greater than the change of the speed in the deceleration control C4 of the right arrival mode.

The direction indication control start time T1 is preset as time that is predetermined time before the deceleration control C2 starts with reference to the deceleration control C2. In the autonomous stop control of the present embodiment, as the direction indication control start time T1, the direction indication control start time T1a for the right arrival mode and the direction indication control start time T1b for the emergency stop mode are predetermined and stored in the ROM and the like. The direction indication control start time T1a and the direction indication control start time T1b have the different setting values, for example, the direction indication control start time T1a is less than the direction indication control start time T1b. Thus, in the emergency stop mode of the autonomous stop control, the direction indicator 22 is turned on earlier than in the right arrival mode, thereby the safety when stopping the vehicle in emergencies is further enhanced.

The pulling over speed Vw is a speed of the subject vehicle $V_0$ in the pulling over control C3. In the autonomous stop control of the present embodiment, since the deceleration control C2 is performed to decrease the speed of the subject vehicle $V_0$ and then the pulling over control C3 is performed with maintaining the speed after the deceleration, the pulling over speed Vw is also the target vehicle speed in the deceleration control C2. Further, in the autonomous stop control of the present embodiment, since the stop control C4 is started after the pulling over control C3 in which the speed of the subject vehicle $V_0$ is maintained at a constant speed, the pulling over speed Vw is also the vehicle speed at the start of the stop control C4. The autonomous stop control of the present embodiment sets the pulling over speed Vw to a relatively low one in order to stop the subject vehicle $V_0$ at the shoulder of the road Ls so as not to discomfort the occupant. Incidentally, although the pulling over speed Vw of the present embodiment is the speed maintained after the deceleration, the pulling over speed Vw may change to the extent that does not discomfort the occupant, and may be a substantially constant speed.

The control parameter decision unit 202 sets the pulling over speed Vw as follows. As illustrated in FIG. 2, the control parameter decision unit 202 acquires a distance W1 between the subject vehicle $V_0$ and the left-side curb SL from the LiDAR device 51L of the sensor 5. Next, the control parameter decision unit 202 calculates an amount of pulling over W3 that is necessary to move the subject vehicle $V_0$ to the shoulder of the road Ls, based on the acquired distances W1 and a predetermined pulling over interval W2 provided between the vehicle centerline Vc of the subject vehicle $V_0$ and the curb SL after the pulling over control C3. Further, the control parameter decision unit 202 calculates a travel distance that is required to move the subject vehicle $V_0$ to the shoulder of the road Ls based on the calculated amount of pulling over W3 and the maximum yaw angle θY determined according to the mode of the generated control plan, and estimates the lateral speed and the lateral acceleration caused in the subject vehicle $V_0$ when performing the pulling over control C3 based on this travel distance, the amount of pulling over W3, and the maximum lateral acceleration GL determined according to the mode of the generated control plan. Then, the control parameter decision unit 202 calculates the pulling over speed Vw based on the estimated lateral speed and lateral acceleration and the pulling over interval W2 described above.

The pulling over time Tw is time required for performing the pulling over control C3. The autonomous stop control of the present embodiment sets the appropriate pulling over time Tw in order to stop the subject vehicle $V_0$ at the shoulder of the road Ls so as not to discomfort the occupant. The pulling over time Tw is calculated based on the estimated lateral speed and lateral acceleration for setting the pulling over speed Vw, and the pulling over interval W2 described above.

The control parameter decision unit 202 inputs to the control plan calculation unit 203 the control parameters determined according to the determination flag, that is, the first deceleration G1, the maximum lateral acceleration GL, the maximum yaw angle θY, the second deceleration G2, the direction indication control start time T1, the pulling over speed Vw and the pulling over time Tw.

Figure 7:
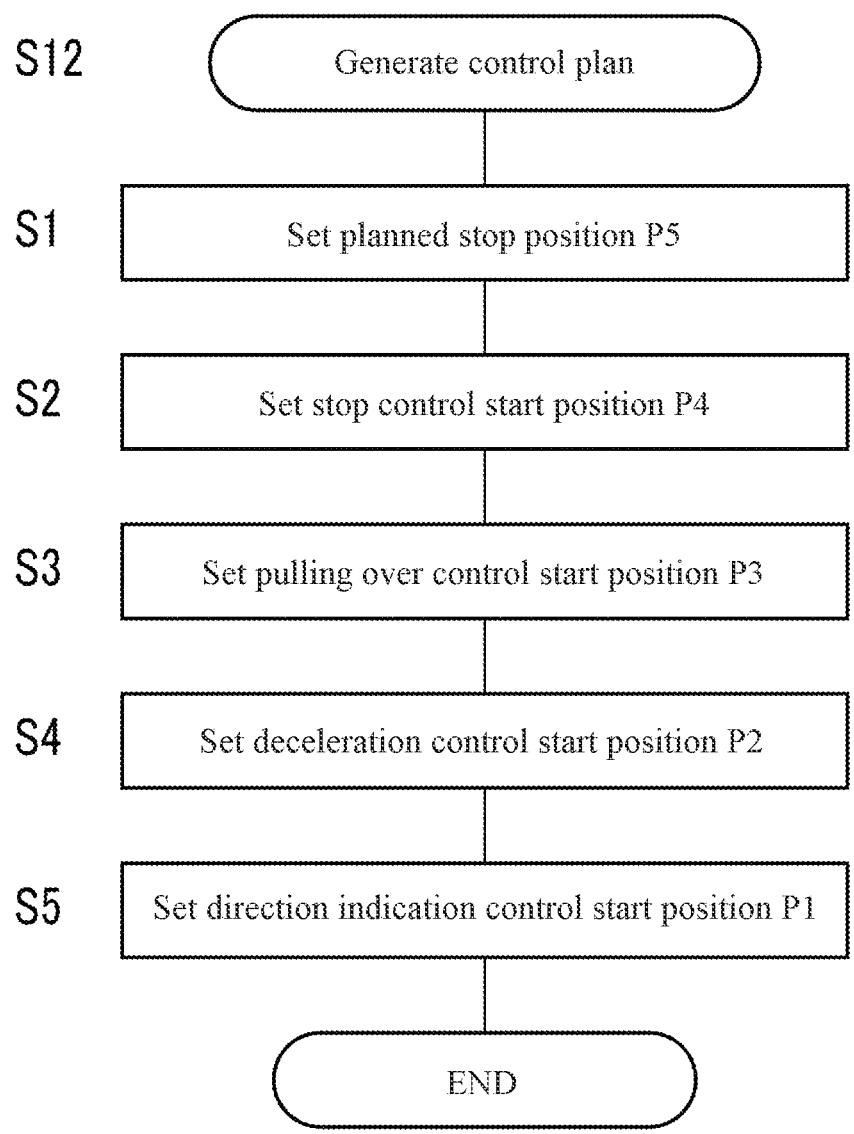
FIG. 7 is a flow chart illustrating a procedure for generating a control plan of the autonomous stop control according to an embodiment of the present invention.

The control plan calculation unit 203 generates the control plan of the autonomous stop control of the present embodiment based on the control parameters input from the control parameter decision unit 202. The flow chart illustrated in FIG. 7 shows a procedure for generating the control plan of the autonomous stop control of the present embodiment.

In the first step S1, the control plan calculation unit 203 sets a planned stop position P5 illustrated in FIG. 4 in response to the determination flag input from the determination unit 201. For example, when the determination flag input from the determination unit 201 is the determination flag "1" representing that the vehicle arrives at the destination, the control plan calculation unit 203 acquires the destination information from the destination setting device 1, and acquires the travelable region information from the travelable region generating unit 6. The control plan calculation unit 203 sets the planned stop position for stopping the subject vehicle $V_0$ with the right arrival mode based on the acquired destination information and the travelable region information.

For example, when the subject vehicle $V_0$ is a typical passenger car, the control plan calculation unit 203 detects the shoulder of the road Ls at which the vehicle can park or stop within the vicinity of the destination, and sets a position that is not occupied by the obstacle such as the parking vehicle in the detected shoulder of the road Ls as the planned stop position P5. When the subject vehicle $V_0$ is a route bus (a bus on a regular route), the control plan calculation unit 203 sets a bus stop located on the route of the route bus as the planned stop position P5.

When the determination flag input from the determination unit 201 is the determination flag "0" due to the doze of the driver or the vehicle failure, the control plan calculation unit 203 acquires the subject vehicle position information from the subject vehicle position detecting device 2, and acquires the travelable region information from the travelable region generating unit 6. The control plan calculation unit 203 detects the shoulder of the road Ls at which the subject vehicle can park or stop based on the acquired subject vehicle position information and the travelable region information, and sets a position that is not occupied by the obstacle such as the parking vehicle in the detected shoulder of the road Ls as the planned stop position P5.

In the next step S2, the control plan calculation unit 203 sets the stop control start position P4 illustrated in FIG. 4. The control plan calculation unit 203 calculates a stop distance H1 required for decelerating with the first deceleration G1 and stopping the subject vehicle $V_0$ traveling at the pulling over speed Vw based on the first deceleration G1 and the pulling over speed Vw input from the control parameter decision unit 202. Further, based on the calculated stop distance H1 and the planned stop position P5 set in the step S1, the control plan calculation unit 203 sets the stop control start position P4 to a position located the stop distance H1 before the planned stop position P5.

In the next step S3, the control plan calculation unit 203 sets the pulling over control start position P3 illustrated in FIG. 4. The control plan calculation unit 203 calculates a pulling over distance H2 that is a travel distance necessary to move the subject vehicle $V_0$ from the lane L1 to the shoulder of the road Ls, based on the pulling over speed Vw and the pulling over time Tw input from the control parameter decision unit 202. In addition, the control plan calculation unit 203 sets the pulling over control start position P3 at a position located the pulling over distance H2 before the stop control start position P4 based on the calculated pulling over distance H2 and the stop control starting point P4 set in the step S2.

In the next step S4, the control plan calculation unit 203 sets the deceleration control start position P2 illustrate in FIG. 4. The control plan calculation unit 203 calculates deceleration distance H3 required to decelerate the subject vehicle $V_0$ to the pulling over speed Vw based on the second deceleration G2 input from the control parameter decision unit 202 and a current vehicle speed of the subject vehicle $V_0$ acquired from the vehicle speed sensor of the subject vehicle position detecting device 2. In addition, the control plan calculation unit 203 sets the deceleration control start position P2 at a position located the deceleration distance H3 before the pulling over control start position P3 based on the calculated deceleration distance H3 and the pulling over control start position P3 set in the step S3.

In the next step S5, the control plan calculation unit 203 sets the direction indication control start position P1 illustrated in FIG. 4. The control plan calculation unit 203 sets the direction indication control start position P1 at a position at which the subject vehicle $V_0$ arrives by the direction indication control start time T1 earlier than the timing that the subject vehicle $V_0$ arrives at the deceleration control start position P2, based on the direction indication control start time T1 input from the control parameter decision unit 202, the deceleration control start position P2 set in in the step S4, and the current vehicle speed of the subject vehicle $V_0$ acquired from the vehicle speed sensor of the subject vehicle position detecting device 2.

In the autonomous stop control of the present embodiment, the control plan may need to be regenerated due to changes in the surrounding situations that occur after the control plan is generated. For example, when another vehicle stops at the planned stop position P5 after the control plan is generated, the planned stop position P5 requires to be reset, and the each of the positions P1 to P4 set based on the planned stop position P5 also needs to be reset. Further, when a stationary obstacle, a preceding vehicle, and the like appear in the travel route to the planned stop position P5 after the control plan is generated, the speed of the subject vehicle $V_0$ is decreased, so that the control plan may need to be regenerated. The control plan calculation unit 203 regenerates the control plan whenever such a situation that the control plan needs to be regenerated occurs.

Figure 8:
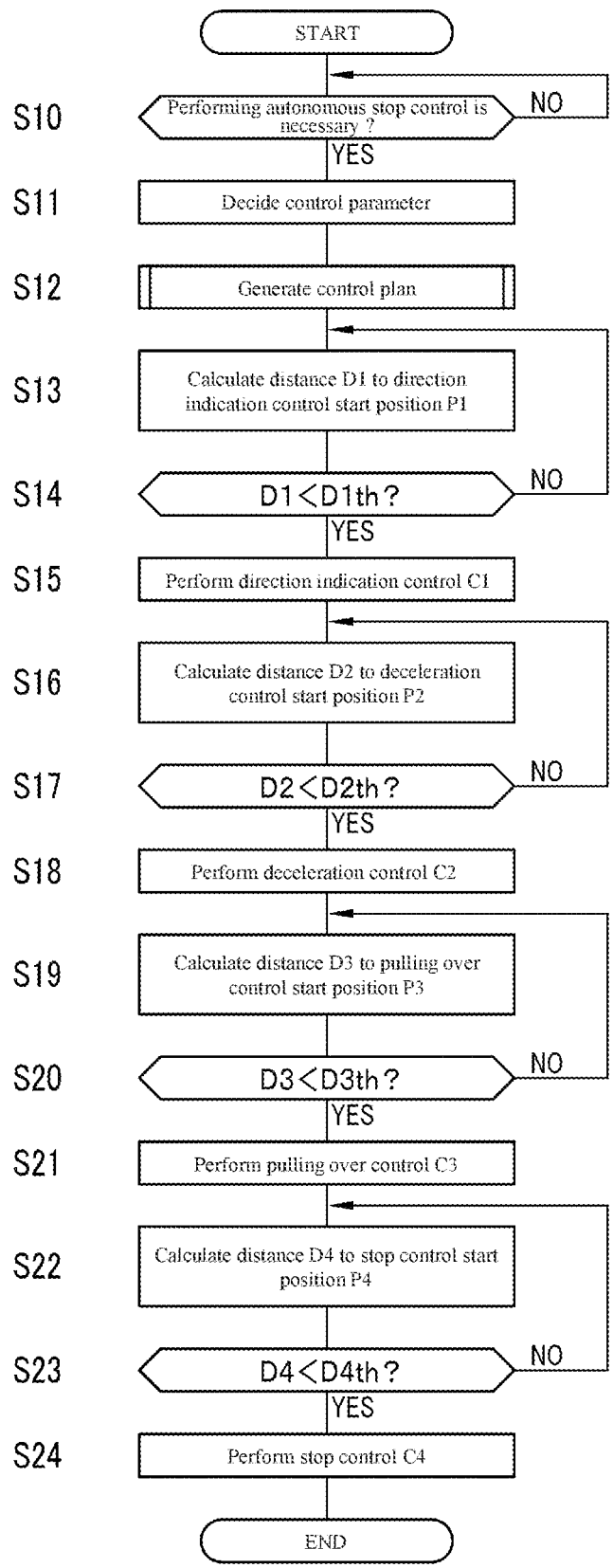
FIG. 8 is a flow chart illustrating a procedure for performing the autonomous stop control according to an embodiment of the present invention.

Next, according to the flow chart illustrated in FIG. 8, an action of the autonomous stop control of the present embodiment is described.

In the first step S10, the determination unit 201 of the autonomous stop control unit 20 determines whether the autonomous stop control needs to be performed in the subject vehicle $V_0$. Specifically, the determination unit 201 determines that the autonomous stop control needs to be performed when the subject vehicle $V_0$ arrives at the destination, when the driver of the subject vehicle $V_0$ becomes unable to drive, or when the failure occurs that interferes with the travel of the subject vehicle $V_0$.

The determination unit 201 inputs the determination flag "1" to the control parameter decision unit 202 when the subject vehicle $V_0$ arrives at the destination. Further, when the driver becomes unable to drive the vehicle or when the failure that interferes with the travel of the subject vehicle $V_0$ occurs, the determination unit 201 inputs the determination flag "0" to the control parameter decision unit 202. Incidentally, when the determination unit 201 determines that the autonomous stop control is not necessary to be performed in the subject vehicle $V_0$, it does not input the determination flag to the control parameter decision unit 202.

When it is determined that the autonomous stop control needs to be performed in the step S10, the process proceeds to the next step S11. In the step S11, the control parameter decision unit 202 of the autonomous stop control unit 20 determines the control parameters of the right arrival mode or the emergency stop mode. The control parameter decision unit 202 inputs to the control plan calculation unit 203 the decided first deceleration G1; the maximum lateral acceleration GL; the maximum yaw angle θY; the second deceleration G2; the direction indication control start time T1; the pulling over speed Vw; and the pulling over time Tw.

In the next step S12, the control plan calculation unit 203 of the autonomous stop control unit 20 generates the control plan of the autonomous stop control. Specifically, the control plan calculation unit 203 sets the planned stop position P5 according to the flow chart illustrated in FIG. 8, and sets the stop control start position P4, the pulling over control start position P3, the deceleration control start position P2, and the direction indication control start position P1 based on the planned stop position P5 and each of the control parameters.

The control plan calculation unit 203 performs the autonomous stop control based on the generated control plan after generating the control plan of the autonomous stop control of the present embodiment.

In the next step S13, the control plan calculation unit 203 acquires the subject vehicle position information from the subject vehicle position detecting device 2, acquires the travelable region information from the travelable region generating unit 6, and calculates the distance D1 from the current position to the direction indication control start position Pb. In the next step S14, the control plan calculation unit 203 compares the calculated distance D1 with a preset predetermined distance D1*th*. When the subject vehicle $V_0$ arrives at a position at which the distance D1 is less than the predetermined distance D1*th*, the process proceeds to the next step S15 to perform the direction indication control C1. The predetermined length D1*th* is set in view of time lag from instructing to perform the direction indication control C1 to actually performing the same. In the direction indication control C1 of the step S15, the control plan calculation unit 203 controls the lighting circuit 21 to turn on the left indicating light of the direction indicator 22.

Incidentally, when the control plan is regenerated by the control plan calculation unit 203 during performing the steps S13 to S14, the direction indication control start position P1 and the distance D1 are updated based on the regenerated control plan in the step S13, and arrival of the subject vehicle $V_0$ to the updated direction indication control start position P1 is determined in the step S14.

In the next step S16, the control plan calculation unit 203 acquires the subject vehicle position information from the subject vehicle position detecting device 2, acquires the travelable region information from the travelable region generating unit 6, and calculates the distance D2 from the current position to the deceleration control start position P2. In the next step S17, the control plan calculation unit 203 compares the calculated distance D2 with a preset predetermined distance D2$th$. When the subject vehicle $V_0$ arrives at a position at which the distance D2 is less than the predetermined distance D2$th$, the process proceeds to the next step S18 to perform the deceleration control C2. The predetermined length D2$th$ is set in view of time lag from instructing to perform the deceleration control C2 to actually performing the same.

In the deceleration control C2 of the step S18, the control plan calculation unit 203 controls the engine 14 and the braking device 15 via the vehicle speed adjusting unit 12 and the vehicle speed servomechanism 13 to decelerate the subject vehicle $V_0$ to the pulling over speed Vw with the first deceleration G1.

Incidentally, when the control plan is regenerated by the control plan calculation unit 203 during performing the steps S16 to S17, the deceleration control start position P2 and the distance D2 are updated based on the regenerated control plan in the step S16, and the arrival of the subject vehicle $V_0$ to the updated deceleration control start position P2 is determined in the step S17.

In the next step S19, the control plan calculation unit 203 acquires the subject vehicle position information from the subject vehicle position detecting device 2, acquires the travelable region information from the travelable region generating unit 6, and calculates the distance D3 from the current position to the pulling over control start position P3. In the next step S20, the control plan calculation unit 203 compares the calculated distance D3 with a preset predetermined distance D3$th$. When the subject vehicle $V_0$ arrives at a position at which the distance D3 is less than the predetermined distance D3$th$, the process proceeds to the next step S21 to perform the pulling over control C3. The predetermined length D3$th$ is set in view of time lag from instructing to perform the pulling over control C3 to actually performing the same.

In the pulling over control C3 of the step S21, the control plan calculation unit 203 has the target route generating unit 7 to change the target route Tp and has the subject vehicle $V_0$ to follow the changed target route Tp with the route track control unit 8, thereby the subject vehicle $V_0$ travels to the shoulder of the road Ls. Specifically, the control plan calculation unit 203 repeatedly detects the distance W1 from the subject vehicle $V_0$ to the curb SL by the LiDAR device 51L of the sensor 5 as illustrated in FIG. 2 while performing the pulling over control C3. The control plan calculation unit 203 updates target route Tp at any time based on the detected distance W1 to secure the predetermined pulling over interval W2 between the subject vehicle $V_0$ and the curb SL. In addition, the control plan calculation unit 203 controls the steering device 10 via the steering actuator 9 so that the subject vehicle $V_0$ follows the updated target route Tp.

Incidentally, in the step S21, the following pulling over control C3 may be performed. As illustrated in FIG. 2, the control plan calculation unit 203 detects the distance W1 from the subject vehicle $V_0$ to the curb SL by the LiDAR device 51L of the sensor 5, and calculates the amount of pulling over W3 based on the detected distance W1 and the predetermined pulling over interval W2 provided between the subject vehicle $V_0$ and the curb SL. Then, the control plan calculation unit 203 sets the final target route Tp1 at a position corresponding to the amount of pulling over W3. Then, the control plan calculation unit 203 gradually moves the target route Tp set along the lane center line Lc of the lane L1 on which the subject vehicle $V_0$ travels to the final target route Tp1 with maintaining the target route Tp parallel to the lane center line Lc by the target route generating unit 7. The route track control unit 8 controls the steering device 10 via the steering actuator 9 so that the subject vehicle $V_0$ follows the target route Tp that gradually moves to the final target route Tp1, thereby the subject vehicle $V_0$ travels from the lane L1 on which the $V_0$ is travelling to the shoulder of the road Ls to stop parallel to the lane L1.

Incidentally, when the control plan is regenerated by the control plan calculation unit 203 during performing the steps S19 to S20, the pulling over control start position P3 and the distance D3 are updated based on the regenerated control plan in step S19, and the arrival of the subject vehicle $V_0$ to the updated pulling over control start position P3 is determined in step S20.

In the next step S22, the control plan calculation unit 203 acquires the subject vehicle position information from the subject vehicle position detecting device 2, acquires the travelable region information from the travelable region generating unit 6, and calculates the distance D4 from the current position to the stop control start position P4. In the next step S23, the control plan calculation unit 203 compares the calculated distance D4 with a preset predetermined distance D4$th$. When the subject vehicle $V_0$ arrives at a position at which the distance D4 is less than the predetermined distance D4$th$, the process proceeds to the next step S24 to perform the stop control C4. The predetermined distance D4$th$ is set in view of time lag from instructing to perform the stop control C4 to actually performing the same.

In the stop control C4 of the step S24, the control plan calculation unit 203 controls the engine 14 and the braking device 15 via the vehicle speed adjusting unit 12 and the vehicle speed servomechanism 13 to decelerate the subject vehicle $V_0$ with the second deceleration G2 and to stop the subject vehicle $V_0$.

When the control plan is regenerated by the control plan calculation unit 203 during performing the steps S22 to S23, the stop control start position P4 and the distance D4 are updated on the basis of the regenerated control plan in the step S22, and the arrival of the subject vehicle $V_0$ with respect to the updated stop control starting point P4 is determined in the step S23.

When the stop control C4 is finished and the subject vehicle $V_0$ stops at the planned stop position P5, the control plan calculation unit 203 continues to perform the direction indication control C1 to light up the right-side indicating lights of the direction indicator 22. Thus, since the direction indicator 22 operates as hazard lamps, it is possible to notify to other vehicles or the like travelling behind the subject vehicle $V_0$ that the subject vehicle $V_0$ stops at the shoulder of the road Ls.

Figure 9:
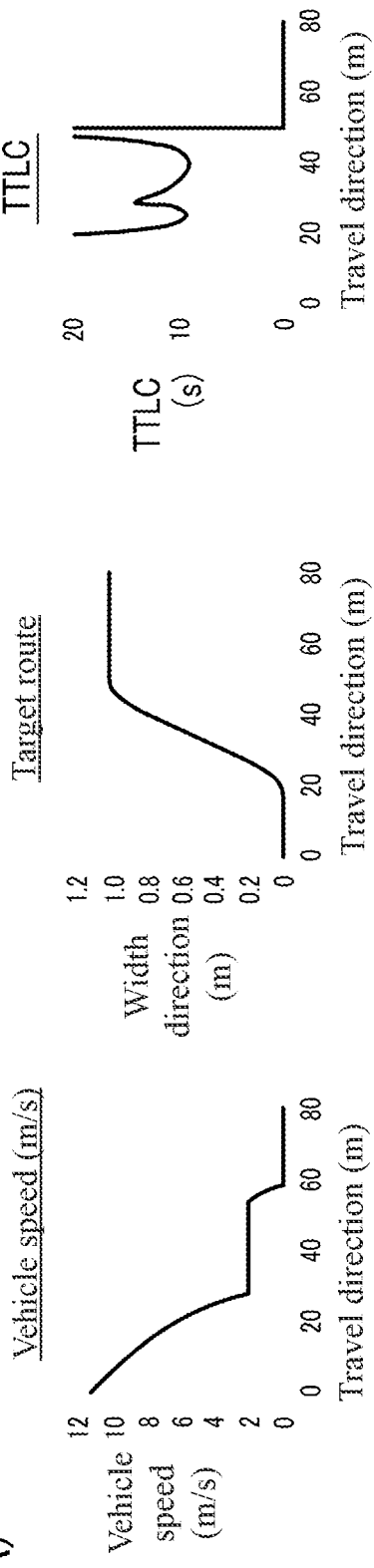
FIGS. 9(A) and 9(B) are diagrams comparing the autonomous stop control according to an embodiment of the present invention and the conventional autonomous stop control illustrated in FIG. 5 with respect to the target route, the target vehicle speed profile, and a TTLC.
Figure 9:
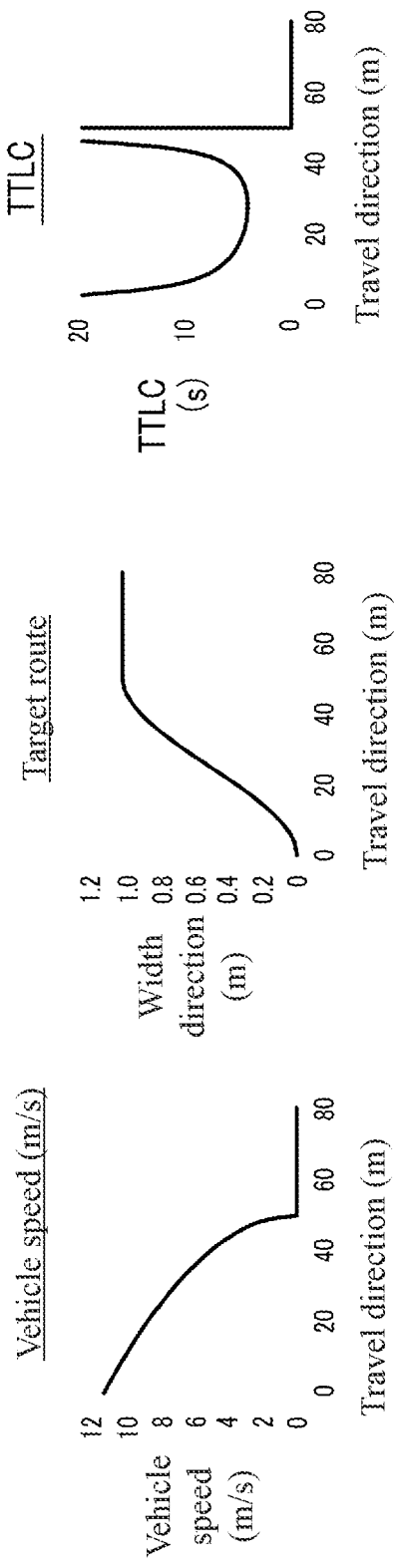

FIG. 9(A) illustrates a target vehicle speed profile (vehicle speed), a target route and a TTLC (time to lateral collision) of the autonomous stop control of the present embodiment.

FIG. 9(B) illustrates a target vehicle speed profile, a target route and a TTLC of the conventional autonomous stop control as illustrated in FIG. 5. Incidentally, the TTLC is the allowance time until a vehicle travelling in a lateral direction collides with an obstacle existing at the destination, and is a value obtained by dividing a distance from the vehicle to the obstacle (a lateral distance) by a relative speed of the vehicle and the obstacle. In the present embodiment, a reciprocal number of the TTLC (1/TTLC) is used as a risk level representing height of the risk of approaching the subject vehicle $V_0$ to the obstacle.

As seen from the graphs of the TTLC illustrated in FIGS. 9(A) and 9(B), in the conventional autonomous stop control that simultaneously performs decelerating the subject vehicle $V_0$ and moving it to the shoulder of the road, the risk level is approximately $\frac{1}{4}$ $s^{-1}$. On the other hand, in the autonomous stop control of the present embodiment, the risk level is about $\frac{1}{9}$ $s^{-1}$, and thus, the risk level can be decreased by 55% compared with the conventional autonomous stop control.

As described above, according to the travel control device VTC for a vehicle and the travel control method for the same of the present embodiment, the autonomous stop control is performs for stopping the subject vehicle $V_0$ at the shoulder of the road Ls when the subject vehicle $V_0$ arrives at the destination while the subject vehicle $V_0$ travels, when the driver of the subject vehicle $V_0$ becomes unable to drive during the travel of the subject vehicle $V_0$, or when the failure occurs that interferes with the travel of the subject vehicle $V_0$ during the travel of the subject vehicle $V_0$. In addition, in this autonomous stop control, the control plan of the autonomous stop control is generated, the control plan comprising: the deceleration control C2 for decreasing the speed of the subject vehicle $V_0$; the pulling over control C3 for moving the subject vehicle $V_0$ from the lane L1 in which the subject vehicle $V_0$ is travelling to the shoulder of the road Ls; and the stop control C4 for stopping the subject vehicle $V_0$ at the shoulder of the road Ls. Then, on the basis of the generated control plan, by individually and sequentially performing each of the deceleration control C2, the pulling over control C3, and the stop control C4, the autonomous stop control is performed to decelerate the subject vehicle $V_0$ and then moving it to the shoulder of the road Ls. As a result, it is possible to perform the autonomous stop control so as not to provide the discomfort to the occupant of the subject vehicle $V_0$ since the speed of the subject vehicle $V_0$ can be kept low when the subject vehicle $V_0$ approaches the shoulder of the road Ls.

Further, according to the travel control device VTC for the vehicle and the travel control method for the same of the present embodiment, when performing the pulling over control C3, the speed of the subject vehicle $V_0$ is maintained at a constant speed. As a result, it is possible to perform the autonomous stop control so as not to discomfort the occupant of the subject vehicle $V_0$ since the rolling, the pitching and the like due to the change in speed do not affect the subject vehicle $V_0$.

Further, according the travel control device VTC for the vehicle and the travel control method for the same of the present embodiment, when the subject vehicle $V_0$ arrives at the destination, the control plan of the right arrival mode (a first mode control plan) is generated, and when the driver becomes unable to drive or the failure that interferes with the travel of the subject vehicle $V_0$ occurs, the control plan of the emergency stop mode (a second mode control plan) is generated in which the subject vehicle $V_0$ stops at the shoulder of the road Ls with a large change in the vehicle conditions relative to the control plan of the right arrival mode. As a result, it is possible to perform the autonomous stop control so as not to discomfort the occupant of the subject vehicle $V_0$ since the control plans of the autonomous stop control can be generated with the optimum mode according to the objective for stopping the subject vehicle $V_0$ at the shoulder of the road Ls.

Further, according the travel control device VTC for the vehicle and the travel control method for the same of the present embodiment, the control plan includes the direction indication control C1 for operating the direction indicator 22 of the subject vehicle $V_0$ predetermined time before starting the deceleration control C2. As a result, it is possible to further enhance the safety when the subject vehicle $V_0$ decelerates in the lane L1 on which the subject vehicle $V_0$ is travelling since that the subject vehicle $V_0$ stops at the shoulder of the road Ls can be notified to other vehicles around the subject vehicle $V_0$.

Further, according the travel control device VTC for the vehicle and the travel control method for the same of the present embodiment, in order to set the pulling over speed Vw that is the speed of the subject vehicle $V_0$ when the pulling over control C3 is performed, the distance W1 from the subject vehicle $V_0$ to the curb SL that is the edge of the shoulder of the road Ls is detected. Next, based on the distance W1 from the subject vehicle $V_0$ to the curb SL and the predetermined pulling over interval W2 between the subject vehicle $V_0$ and the curb SL after the pulling over control C3 is performed, the amount of pulling over W3 that is required for the subject vehicle $V_0$ to travel to the shoulder of the road Ls is calculated. Then, the lateral speed and lateral acceleration caused in the subject vehicle $V_0$ when the pulling over control C3 is performed are estimated based on the amount of pulling over W3, and the pulling over speed Vw is set based on the estimated lateral speed and lateral acceleration and the pulling over interval W2. As a result, the pulling over speed Vw when the subject vehicle $V_0$ travels to the shoulder of the road Ls can be set to an optimum speed that does not discomfort the occupant.

Further, according the travel control device VTC for the vehicle and the travel control method for the same of the present embodiment, the pulling over time Tw required for the pulling over control is set based on the lateral speed and lateral acceleration estimated based on the amount of pulling over W3 and pulling over interval W2. As a result, the pulling over time Tw that the subject vehicle $V_0$ travels to the shoulder of the road Ls can be set to the optimum time that does not discomfort the occupant.

Further, according the travel control device VTC for the vehicle and the travel control method for the same of the present embodiment, in order to generate the control plan, the planned stop position P5 for stopping the subject vehicle $V_0$ is set according to the mode of the control plan. Next, corresponding to the mode of the control plan, the first deceleration G1 caused in the subject vehicle $V_0$ when performing the stop control C4 is set. Then, the stop distance H1 required to stop the subject vehicle $V_0$ travelling at the pulling over speed Vw is calculated based on the pulling over speed Vw and the first deceleration G1. Then, the stop control start position P4 is set based on the stop distance H1 and the planned stop position P5. In addition, based on the pulling over speed Vw and the pulling over time Tw, the pulling over distance H2 that is a travel distance required to move the subject vehicle $V_0$ to the shoulder of the road Ls is calculated. And, based on the pulling over distance H2 and the stop control start position P4, the pulling over control start position P3 is set. Furthermore, corresponding to the mode of the control plan, the second deceleration G2 caused in the subject vehicle $V_O$ when the deceleration control is performed is set. Then, the deceleration distance H3 that is required to decrease the speed of the subject vehicle $V_O$ to the pulling over speed Vw is calculated based on the speed of the subject vehicle $V_O$ before starting the autonomous stop control and the second deceleration G2. Then, the deceleration control start position P2 is set based on the deceleration distance H3 and the pulling over control start position P3. As a result, by setting the planned stop position P5 first, the stop control start position P4, the pulling over control start position P3, and the deceleration control start position P2 are set based on the planned stop position P5, and the control plan can be generated so that each of the controls are performed individually and sequentially. Therefore, the autonomous stop control can be performed so as not to discomfort the occupant.

According to travel control device VTC and travel control method of the vehicle according to present embodiment: when subject vehicle $V_O$ reaches deceleration control start position P2, deceleration control C2 is started to decelerate subject vehicle $V_O$ to pulling over speed Vw in the second deceleration G2; when subject vehicle $V_O$ reaches pulling over control P3, pulling over control C3 is started to move subject vehicle $V_O$ to shoulder of the road Ls in pulling over speed Vw; and when subject vehicle $V_O$ reaches stop control P4, stop control C4 is started to decelerate subject vehicle $V_O$ traveling in start position Vw in the first deceleration G 1 to stop. As a result, each of the deceleration control C2, the pulling over control C3, and the stop control C4 can be individually and sequentially performed respectively in the deceleration control start position P2, the pulling over control start position P3, and the stop control start position P4 set in the control plan. Therefore, each control can be performed smoothly and sequentially, and the autonomous stop control as a whole can be performed. Accordingly, the autonomous stop control can be performed so as not to discomfort the occupant.

Further, according the travel control device VTC for the vehicle and the travel control method for the same of the present embodiment, the distance W1 from the subject vehicle $V_O$ to the curb SL that is the edge of the shoulder of the road Ls is detected after starting the pulling over control C3, and the subject vehicle $V_O$ is moved to the shoulder of the road Ls so that the detected distance between the subject vehicle $V_O$ and the curb SL becomes the predetermined pulling over interval W2. As a result, it is possible to perform the autonomous stop control so as not to discomfort the occupant of the subject vehicle $V_O$ since the pulling over control C3 can be performed while maintaining the proper distance between the subject vehicle $V_O$ and the curb SL at all times.

Further, according the travel control device VTC for the vehicle and the travel control method for the same of the present embodiment, the pulling over control C3 sets the final target route Tp1 for stopping the subject vehicle $V_O$ at the shoulder of the road Ls based on the amount of pulling over W3. Next, the pulling over control C3 gradually moves the target route Tp set along the lane center line Lc of the lane L1 on which the subject vehicle $V_O$ travels to the final target route Tp1 while maintaining the target route Tp parallel to the lane center line Lc, and has the subject vehicle $V_O$ to follow the target route Tp moved gradually. As a result, even though a measurement result of the distance to the curb SLs includes spatial and temporal noises, the subject vehicle $V_O$ can smoothly travel to the shoulder of the road Ls and the subject vehicle $V_O$ can stop in parallel with the lane L1. Accordingly, the autonomous stop control can be performed so as not to discomfort the occupant.

Further, according the travel control device VTC for the vehicle and the travel control method for the same of the present embodiment, the control plan is regenerated when the situation around the subject vehicle $V_O$ changes while performing the autonomous stop control, and the autonomous stop control is performed based on the regenerated control plan. As a result, the subject vehicle $V_O$ can stop properly at the shoulder of the road Ls even though the situation around the subject vehicle $V_O$ changes. Therefore, the autonomous stop control can be performed so as not to discomfort the occupant.

Incidentally, in the above embodiment, the same control plan of the emergency stop mode is generated when the driver of subject vehicle $V_O$ becomes unable to drive and when the failure that interferes with the travel of the subject vehicle $V_O$. However, when the driver becomes unable to drive the vehicle, a stop mode may be set in which the subject vehicle $V_O$ stops in a vehicle motion different from the case in which the failure that interferes with the travel of the subject vehicle $V_O$ occurs.

DESCRIPTION OF REFERENCE NUMERALS

20 . . . Autonomous stop control unit
   201 . . . Determination unit
   202 . . . Control parameter decision unit
   203 . . . Control plan calculation unit
23 . . . In-car camera
24 . . . Self-diagnostic unit
VTC . . . Travel control device
$V_O$ . . . Subject vehicle
L1 . . . Lane
Ls . . . Shoulder of a road
SL, SR . . . Curb
Lc . . . Lane center line
Tp . . . Target route
Tp1 . . . Final target route
P1 . . . Direction indication control start position
P2 . . . Deceleration control start position
P3 . . . Pulling over control start position
P4 . . . Stop control start position
P5 . . . Planned stop position
C1 . . . Direction indication control
C2 . . . Deceleration control
C3 . . . Pulling over control
C4 . . . Stop control

The invention claimed is:

1. A travel control method for a vehicle for stopping a subject vehicle at a shoulder of a road when the subject vehicle arrives at a destination while the subject vehicle travels, or when a driver of the subject vehicle becomes unable to drive during travel of the subject vehicle or when a failure occurs that interferes with the travel of the subject vehicle during the travel of the subject vehicle, comprising:
   generating a control plan for autonomous stop control comprising deceleration control for decreasing a speed of the subject vehicle to a target vehicle speed while maintaining course;
   thereafter, pulling over control for moving the subject vehicle from a lane in which the subject vehicle travels to the shoulder of the road with maintaining the speed of the subject vehicle at the target vehicle speed; and,
   thereafter, stop control for stopping the subject vehicle at the shoulder of the road; and performing the autonomous stop control for decelerating the subject vehicle and then moving the subject vehicle to the shoulder of the road by individually and sequentially performing each of the deceleration control, the pulling over control, and the stop control, in order of the deceleration control, the pulling over control, and the stop control, on a basis of the control plan.

2. The travel control method of the vehicle according to claim 1, wherein the control plan comprises:
   a first mode control plan performed when the subject vehicle arrives at the destination; and
   a second mode control plan performed when the driver becomes unable to drive or when the failure occurs that interferes with the travel of the subject vehicle,
   wherein a second deceleration of the subject vehicle while performing the deceleration control corresponding to the second mode control plan is set higher than the second deceleration of the subject vehicle while performing the deceleration control corresponding to the first mode control plan.

3. The travel control method of the vehicle according to claim 1, wherein the control plan includes a direction indication control for operating a direction indicator of the subject vehicle a predetermined time before starting the deceleration control.

4. The travel control method for the vehicle according to claim 2, for setting a pulling over speed that is the speed of the subject vehicle while performing the pulling over control, comprising:
   detecting a distance from the subject vehicle to an edge of the shoulder of the road;
   calculating an amount of pulling over required to make a distance between a vehicle centerline of the subject vehicle and the edge of the shoulder of the road to a predetermined interval based on the distance from the subject vehicle to the edge of the shoulder of the road and the predetermined interval, the predetermined interval being an interval between the vehicle centerline of the subject vehicle and the edge of the shoulder of the road when the pulling over control is finished;
   estimating a lateral speed and a lateral acceleration caused in the subject vehicle while performing the pulling over control based on the amount of pulling over; and
   setting the pulling over speed based on the estimated lateral speed, the estimated lateral acceleration, and the predetermined interval.

5. The travel control method for the vehicle according to claim 4, wherein pulling over time required for performing the pulling over control is set based on the lateral speed, the lateral acceleration, and the predetermined interval, the lateral speed and the lateral acceleration being estimated from the amount of pulling over.

6. The travel control method for the vehicle according to claim 5, for generating the control plan, comprising:
   setting a planned stop position for stopping the subject vehicle corresponding to a mode of the control plan;
   setting a first deceleration caused in the subject vehicle while performing the stop control corresponding to the mode of the control plan;
   calculating a stop distance required to stop the subject vehicle travelling at the pulling over speed based on the pulling over speed and the first deceleration;
   setting a stop control start position based on the stop distance and the planned stop position;
   calculating a pulling over distance based on the pulling over speed and the pulling over time, the pulling over distance being a travel distance required to move the subject vehicle to the shoulder of the road;
   setting a pulling over control start position based on the pulling over distance and the stop control start position;
   setting the second deceleration caused in the subject vehicle while performing the deceleration control corresponding to the mode of the control plan;
   calculating a deceleration distance required to decelerate the subject vehicle to the pulling over speed based on the speed of the subject vehicle before starting the autonomous stop control and the second deceleration; and
   setting a deceleration control start position based on the deceleration distance and the pulling over control start position.

7. The travel control method for the vehicle according to claim 6, comprising:
   starting the deceleration control to decrease the speed of the subject vehicle to the pulling over speed with the second deceleration when the subject vehicle arrives at the deceleration control start position;
   starting the pulling over control to move the subject vehicle to the shoulder of the road with the pulling over speed when the subject vehicle arrives at the pulling over control start position; and
   starting the stop control to decelerate the subject vehicle travelling at the pulling over speed with the first deceleration and stop the subject vehicle when the subject vehicle arrives at the stop control start position.

8. The travel control method for the vehicle according to claim 7, wherein the pulling over control detects a distance from the subject vehicle to the edge of the shoulder of the road after starting the pulling over control and moves the subject vehicle to the shoulder of the road so that the detected distance between the subject vehicle and the edge of the shoulder of the road becomes the predetermined interval.

9. The travel control method for the vehicle according to claim 7, wherein the pulling over control sets a final target route for stopping the subject vehicle at the shoulder of the road based on the amount of pulling over; gradually moves a target route set along a lane center line of a lane on which the subject vehicle travels to the final target route with maintaining a longitudinal component of a travel direction of the subject vehicle parallel to the lane center line; and has the subject vehicle to follow the gradually moved target route.

10. The travel control method for the vehicle according to claim 7, further comprising:
    regenerating the control plan when a change occurs in a situation around the subject vehicle while performing the autonomous stop control; and
    performing the autonomous stop control based on the regenerated control plan.

11. A travel control device for a vehicle for stopping a subject vehicle at a shoulder of a road when the subject vehicle arrives at a destination while the subject vehicle travels, or when a driver of the subject vehicle becomes unable to drive during travel of the subject vehicle or when a failure occurs that interferes with the travel of the subject vehicle during the travel of the subject vehicle, wherein the travel control device is configured to:
    generate a control plan for autonomous stop control comprising deceleration control for decreasing a speed of the subject vehicle to a target vehicle speed while maintaining course;

thereafter, pulling over control for moving the subject vehicle from a lane in which the subject vehicle travels to the shoulder of the road with maintaining the speed of the subject vehicle at the target vehicle speed; and, thereafter, stop control for stopping the subject vehicle at the shoulder of the road; and perform the autonomous stop control for decelerating the subject vehicle and then moving the subject vehicle to the shoulder of the road by individually and sequentially performing each of the deceleration control, the pulling over control, and the stop control, in order of the deceleration control, the pulling over control, and the stop control, on a basis of the control plan.

12. A travel control method for a vehicle for stopping a subject vehicle at a shoulder of a road when the subject vehicle arrives at a destination while the subject vehicle travels, or when a driver of the subject vehicle becomes unable to drive during travel of the subject vehicle or when a failure occurs that interferes with the travel of the subject vehicle during the travel of the subject vehicle, comprising:

generating a control plan for autonomous stop control comprising deceleration control for decreasing a speed of the subject vehicle to a target vehicle speed while maintaining course;

thereafter, pulling over control for moving the subject vehicle from a lane in which the subject vehicle travels to the shoulder of the road with maintaining the speed of the subject vehicle at the target vehicle speed; and, thereafter, stop control for stopping the subject vehicle at the shoulder of the road; and performing the autonomous stop control for decelerating the subject vehicle and then moving the subject vehicle to the shoulder of the road by individually and sequentially performing each of the deceleration control, the pulling over control, and the stop control, in order of the deceleration control, the pulling over control, and the stop control, on a basis of the control plan, and for setting a pulling over speed that is the speed of the subject vehicle while performing the pulling over control, detecting a distance from the subject vehicle to an edge of the shoulder of the road;

calculating an amount of pulling over required to make a distance between a vehicle centerline of the subject vehicle and the edge of the shoulder of the road to a predetermined interval based on the distance from the subject vehicle to the edge of the shoulder of the road and the predetermined interval, the predetermined interval being an interval between the vehicle centerline of the subject vehicle and the edge of the shoulder of the road when the pulling over control is finished;

estimating a lateral speed and a lateral acceleration caused in the subject vehicle while performing the pulling over control based on the amount of pulling over; and setting the pulling over speed based on the estimated lateral speed, the estimated lateral acceleration, and the predetermined interval.

13. The travel control method for the vehicle according to claim 12, wherein pulling over time required for performing the pulling over control is set based on the lateral speed, the lateral acceleration, and the predetermined interval, the lateral speed and the lateral acceleration being estimated from the amount of pulling over.

14. The travel control method for the vehicle according to claim 13, for generating the control plan, comprising:

setting a planned stop position for stopping the subject vehicle corresponding to a mode of the control plan;

setting a first deceleration caused in the subject vehicle while performing the stop control corresponding to the mode of the control plan;

calculating a stop distance required to stop the subject vehicle travelling at the pulling over speed based on the pulling over speed and the first deceleration;

setting a stop control start position based on the stop distance and the planned stop position;

calculating a pulling over distance based on the pulling over speed and the pulling over time, the pulling over distance being a travel distance required to move the subject vehicle to the shoulder of the road;

setting a pulling over control start position based on the pulling over distance and the stop control start position;

setting a second deceleration caused in the subject vehicle while performing the deceleration control corresponding to the mode of the control plan;

calculating a deceleration distance required to decelerate the subject vehicle to the pulling over speed based on the speed of the subject vehicle before starting the autonomous stop control and the second deceleration; and setting a deceleration control start position based on the deceleration distance and the pulling over control start position.

15. The travel control method for the vehicle according to claim 14, comprising:

starting the deceleration control to decrease the speed of the subject vehicle to the pulling over speed with the second deceleration when the subject vehicle arrives at the deceleration control start position;

starting the pulling over control to move the subject vehicle to the shoulder of the road with the pulling over speed when the subject vehicle arrives at the pulling over control start position; and starting the stop control to decelerate the subject vehicle travelling at the pulling over speed with the first deceleration and stop the subject vehicle when the subject vehicle arrives at the stop control start position.

16. The travel control method for the vehicle according to claim 15, wherein the pulling over control detects a distance from the subject vehicle to the edge of the shoulder of the road after starting the pulling over control and moves the subject vehicle to the shoulder of the road so that the detected distance between the subject vehicle and the edge of the shoulder of the road becomes the predetermined interval.

17. The travel control method for the vehicle according to claim 15, wherein the pulling over control sets a final target route for stopping the subject vehicle at the shoulder of the road based on the amount of pulling over; gradually moves a target route set along a lane center line of a lane on which the subject vehicle travels to the final target route with maintaining a longitudinal component of a travel direction of the subject vehicle parallel to the lane center line; and has the subject vehicle to follow the gradually moved target route.

18. The travel control method for the vehicle according to claim 15, further comprising:
  regenerating the control plan when a change occurs in a situation around the subject vehicle while performing the autonomous stop control; and
  performing the autonomous stop control based on the regenerated control plan.

\* \* \* \* \*